Aug. 15, 1967  A. L. HARDY  3,335,970
FOOD WASTE DISPOSER
Filed Jan. 5, 1965

INVENTOR.
ALBERT L. HARDY
BY James E. Espe
HIS ATTORNEY

3,335,970
FOOD WASTE DISPOSER
Albert L. Hardy, Louisville, Ky., assignor to General Electric Company, a corporation of New York
Filed Jan. 5, 1965, Ser. No. 423,443
7 Claims. (Cl. 241—188)

ABSTRACT OF THE DISCLOSURE

An electric motor for use with a food waste disposer wherein the motor stator is provided with slots through which comminuted food waste can flow from a comminuting chamber to a sewer system.

---

Figure 1:
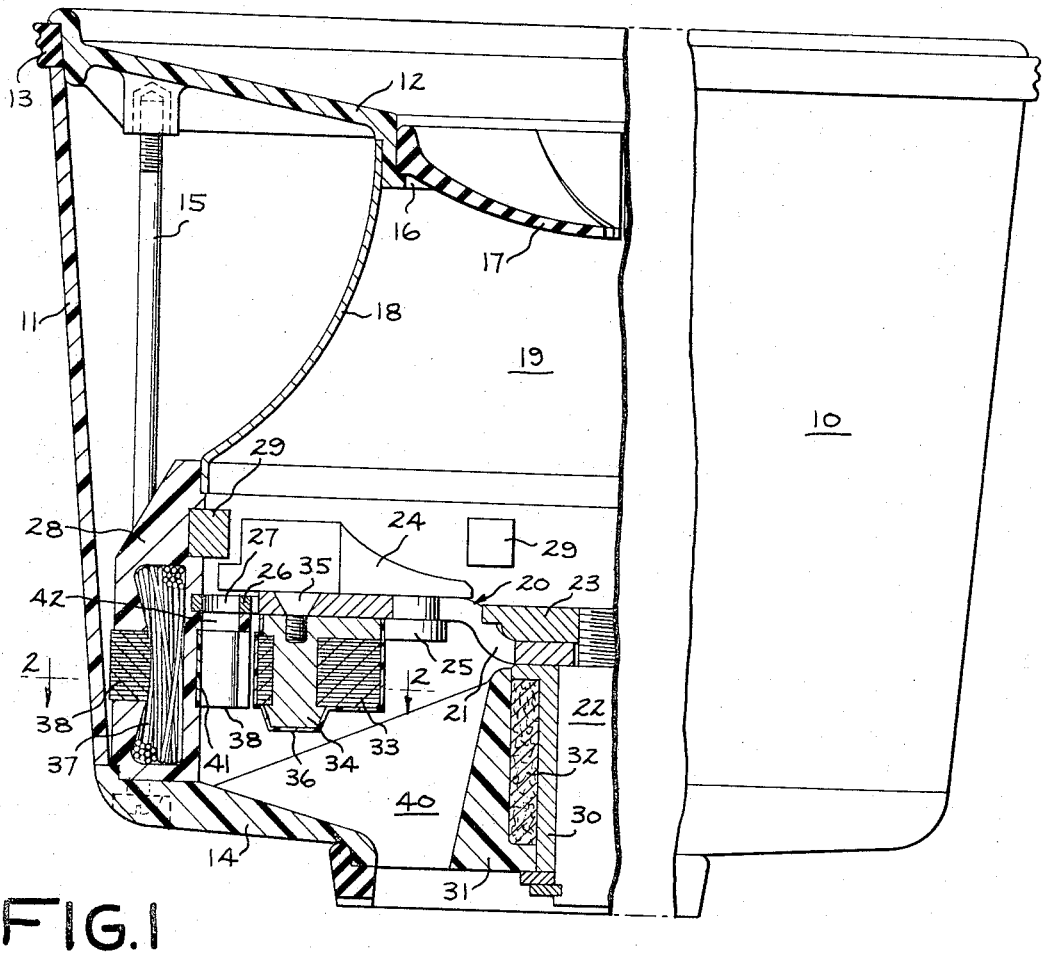

This invention relates generally to food waste disposers and, more specifically, to an improved electric motor construction for use with a food waste disposer.

Quite often a food waste disposer must be installed in relatively cramped quarters. For example, the most common installation area for a domestic food waste disposer is in the cabinet below the kitchen sink. This is often an area of limited size and especially so since it must also accommodate plumbing for the sink. Food waste disposer compactness results in the immediate benefit of increased usable storage space even in those cases where the quarters below the sink are reasonably ample. Another type of food waste disposer which has come into vogue is the portable type which, when in operation, sets within the kitchen sink and discharges the comminuted food waste directly into the sink drain. Since the presence of water is necessary for suitable operation, the food waste disposer must be sufficiently small to easily fit beneath the sink faucet while resting within the sink. In view of the foregoing comments, it is apparent that a food waste disposer of decreased size, without sacrifice of disposal capacity, would be desirable.

Accordingly, it is an object of this invention to provide an improved food waste disposer.

It is another object of this invention to provide an improved electric motor especially adapted for use in a food waste disposer.

It is also an object of this invention to provide a food waste disposer of significantly smaller size than food waste disposers heretofore available.

It is yet another object of this invention to provide a food waste disposer with an electric motor of such configuration that the food waste disposer is significantly smaller than food waste disposers heretofore available without loss of disposal capacity.

Briefly stated, in accordance with one aspect of the invention, there is provided a food waste disposer having a comminuting chamber and a rotatable flywheel disposed near the bottom of the chamber. At least one comminuting impeller is carried by the flywheel for rotation therewith and is adapted to cooperate with a stationary grind pad provided within the chamber to comminute food waste. An electric motor armature is rigidly secured to the bottom surface of the flywheel and an electric motor stator is disposed about the armature. A plurality of elongated slots are provided within the stator and serve as passageways for the flow of comminuted food waste from the comminuting chamber to a discharge means which eventually communicates with the normal household sewer system. The afore-described arrangement results in a significantly compact disposer having a disposal capacity comparable to disposers much larger in size. The obvious reason for the resulting compactness is that the drive motor for the disposer is incorporated directly into the comminuting apparatus rather than being axially spaced therefrom and interconnected therewith by means of a shaft as is normally done in food waste disposers heretofore available.

Figure 2:
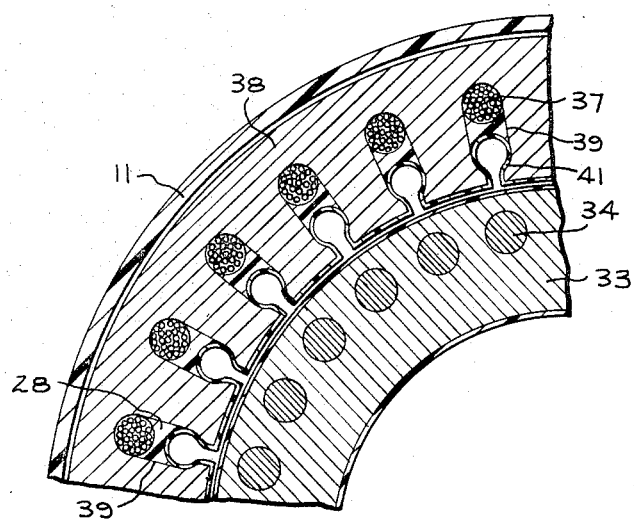

While the specification concludes with claims particularly pointing out and distinctly claiming the subject matter which is regarded as the invention, it is believed the invention will be better understood from the following description taken in connection with the accompanying drawing, in which:

FIGURE 1 is a side elevational view, partially cut away and partially in section to show details, of a portable food waste disposer employing the present invention; and FIGURE 2 is a partial sectional view taken along line 2—2 of FIGURE 1.

Referring now to the drawing, and particularly to FIGURE 1 thereof, there is illustrated a portable food waste disposer 10 with which the present invention may be employed. Disposer 10 includes an outer housing 11, generally annular in form, and which may be constructed from any suitable material which provides the required structural characteristics. An upper member 12 fits across the open top of housing 11. An annular gasket 13 is provided between member 12 and housing 11 and projects radially outward from housing 11 to serve as a resilient bumper to minimize scuffing of the kitchen sink as disposer 11 is moved about within the sink. Spanning across the open bottom of housing 11 is a bottom member 14. Members 12 and 14 are secured to housing 11 by means of a plurality of bolts 15 which, when tightened, draw members 12 and 14 into rigid engagement with housing 11.

Member 12 has a central opening 16 therein which allows the admission of food waste and water into disposer 10. A flexible splash guard 17 is disposed within opening 16 and is so designed as to allow the admission of food waste and water into disposer 10 and at the same time to prevent food waste and water from escaping through opening 16 when disposer 10 is operated.

An annular liner 18 extends downwardly and outwardly from upper member 12 and defines the upper region of a comminuting chamber 19. The lower extremity of comminuting chamber 19 is defined by a comminuting assembly 20. Assembly 20 includes a rotatable flywheel 21 secured to a shaft 22 by means of a nut 23. Comminuting assembly 20 also includes at least one impeller 24 which is pivotally secued to flywheel 21 by means of a pin 25. It is to be understood that impeller 24 is free to rotate relative to flywheel 21 about pin 25 to thereby minimize jamming of the disposer during comminution of relatively brittle objects such as bones or peach pits.

An annular strainer 26 is positioned radially outward from the flywheel 21 and is provided with a plurality of openings 27 which allow comminuted food waste and water to pass from chamber 19 but which maintains uncomminuted food waste within chamber 19 until it is ground sufficiently small to pass through openings 27. Strainer 26 is supported and held stationary by being embedded in an annular block 28 of suitable non-corrosive and electrically insulative material such as, for example, epoxy resin. Block 28 also supports a plurality of stationary grind pads 29 which cooperate with impellers 24 to comminute the food waste within chamber 19.

Shaft 22 is rotatably supported from bottom member 14 by means of a bearing 30 which in turn is supported by a central projection 31 extending upwardly from member 14. Lubricating means 32 are provided between projection 31 and bearing 30 to suitably lubricate bearing 30.

Most of the structure described up to this point is substantially conventional in nature. That is, many food waste disposers heretofore available have comprised the elements discussed thus far. However, in food waste disposers heretofore available, an electric drive motor was connected to a shaft disposed in a manner similar to shaft 22. As discussed earlier, such an arrangement results in an elongated food waste disposer which consumes substantial space either in the sink, with a portable food waste disposer as shown in FIGURE 1, or beneath the kitchen sink with a food waste disposer supported in that location. It is within the contemplation of the present invention to provide a drive motor with power comparable to motors heretofore available but which consumes significantly less vertical space.

In accordance with the present invention, a structure, serving as the armature or rotor of an induction motor is secured directly to the bottom surface of flywheel 21. This structure includes a laminated iron or steel core 33 have associated therewith a cast aluminum winding 34. Core 33 and winding 34 may be integrally cast as is well known in the squirrel cage induction motor art. This armature or rotor structure is secured to the bottom of flywheel 21 by means of a plurality of screws 53. A coating or film 36 of suitably non-corrosive and non-magnetic material is applied to the armature to combat any corrosive effect that the comminuted food waste and water may have as it passes from chamber 19 to be discharged from disposer 10.

The stator for the drive motor is substantially encapsulated in block 28. The stator includes winding 37 and laminated iron or steel core 38. A portion of core 38 extends beyond the inner periphery of block 28. This portion which extends beyond block 28 is divided into segments by a plurality of slots 39 which are disposed radially outwardly from the armature. As best seen in FIGURE 2, slots 39 receive winding 37; however, the slots are substantially more elongated than is conventional in an induction motor. The winding 37 fills only a relatively small portion of each slot while the remainder of the slot is exposed beyond block 28. That portion of the slots which is exposed beyond block 28 serves as a passageway between chamber 19 and a sump 40 which is disposed below the comminuting assembly and which communicates with the kitchen sing drain so that comminuted food waste and water will pass therethrough directly into the drain.

That portion of the core 38 which extends inwardly beyond block 28 is provided with a coating or film 41 similar to film 36 associated with the armature.

Holes 27 in annular strainer 26 are positioned in alignment with slots 39 in core 38 and the encapsulating material of block 28 extends to the inner periphery of strainer 26. Holes 42 are provided through this portion of block 28, in alignment with holes 27 and slots 39 to present smooth passageway for the comminuted waste as it flows from chamber 19 to sump 40.

It should be appreciated, of course, that certain of the features described above are not necessarily limited to the exact details described. For example, the winding 34 of the rotor need not be cast aluminum since any conventional induction motor armature winding could be adapted for use with the present invention. Moreover, the coatings or films 36 and 41 may be eliminated if corrosion of the parts so protected is not an important factor in any given installation. Also, it is to be understood that although the present invention is described in use with a portable food paste disposer it can very easily be employed in an under-sink disposer.

To briefly describe the operation of the disposer 10 illustrated in FIGURE 1, food waste and water are admitted to chamber 19 through opening 16 by manually flexing splash guard 17. Comminuting assembly 20 is caused to rotate by energizing winding 37 and centrifugal force maintains impeller 24 in operative relationship with grind pads 29 as illustrated in FIGURE 1. The food waste is comminuted by the cooperation of the impeller 24 with pads 29. As the food wase is comminuted, the water being continuously introduced into chamber 19 carries the comminuted food waste through openings 27 and slots 39 into sump 40 from where it is directly discharged into the sink drain. For purposes of convenience, disposer 10 is usually placed so that the outlet from sump 40 is disposed directly above sink drain so that no food waste accumulates within the kitchen sink.

As will be evident from the foregoing description, certain aspects of the invention are not limited to the particular details of construction of the example illustrated, and it is contemplated that various other modifications or applications will occur to those skilled in the art. Is is therefore intended that the appended claims shall cover such modifications and applications as do not depart from the true spirit and scope of the invention.

What I claim as new and desire to secure by Letters Patent of the United States is:

1. A food waste disposer comprising:
   (a) a comminuting chamber,
   (b) a comminuting assembly disposed within said chamber,
   (c) an electric motor armature rigidly secured to said said comminuting assembly,
   (d) an electric motor stator disposed about said armature, and
   (e) a plurality of elongated slots disposed radially outwardly from said armature and extending through said stator and serving as passageways for the flow of comminuted food waste from said comminuting chamber.

2. A food waste disposer comprising:
   (a) a comminuting chamber,
   (b) a rotatable flywheel disposed at the bottom of said chamber,
   (c) at least one comminuting impeller carried by said flywheel for rotation therewith,
   (d) at least one grind pad within said chamber adapted to cooperate with said impeller to comminute food waste,
   (e) an electric motor armature rigidly secured to said flywheel,
   (f) an electric motor stator disposed about said armature, and
   (g) a plurality of elongated slots disposed radially outwardly from said armature and extending through said stator and serving as passageways for the flow of comminuted food waste from said comminuting chamber.

3. A food waste disposer comprising:
   (a) a comminuting chamber,
   (b) a rotatable flywheel disposed at the bottom of said chamber,
   (c) at least one comminuting impeller carried by said flywheel for rotation therewith,
   (d) at least one grind pad within said chamber adapted to cooperate with said impeller to comminute food waste,
   (e) an electric motor armature rigidly secured to the bottom surface of said flywheel,
   (f) an electric motor stator disposed about said armature, and
   (g) a plurality of elongated slots extending through said stator and serving as passageways for the flow of comminuted food waste from said comminuting chamber.

4. A food waste disposer comprising:
   (a) a comminuting chamber,
   (b) a rotatable flywheel disposed at the bottom of said chamber,
   (c) at least one comminuting impeller carried by said flywheel for rotation therewith,
   (d) at least one grind pad within said chamber adapted to cooperate with said impeller to comminute food waste,
   (e) an electric motor armature rigidly secured to said flywheel, (f) an electric motor stator disposed about said armature, (g) a plurality of elongated slots disposed radially outwardly from said armature and extending through said stator and serving as passageways for the flow of comminuted food waste from said comminuting chamber, and (h) each of said plurality of elongated slots being provided with a coating of non-corrosive film to minimize corrosive attack from the food waste and water passing therethrough.

5. A food waste disposer comprising:
 (a) a comminuting chamber,
 (b) a rotatable flywheel disposed within said chamber,
 (c) at least one comminuting impeller carried by said flywheel for rotation therewith,
 (d) at least one grind pad within said chamber adapted to cooperate with said impeller to comminute food waste,
 (e) an electric motor armature rigidly secured to said flywheel,
 (f) an electric motor stator disposed about said armature and comprising:
  (aa) a magnetic core,
  (bb) a non magnetic insulative block encapsulating the outer portion of said core,
  (cc) a stator winding wholly encapsulated within said block and passing through said core,
  (dd) a plurality of elongated slots extending through said core and opening toward the inner periphery of said core,
  (ee) each of said plurality of slots serving as passageways for the flow of comminuted food waste from said comminuting chamber.

6. The invention defined in claim 5 wherein each of said plurality of slots is coated with a film of anti-corrosive material to minimize corrosive attack upon the core as comminuted food waste particles pass therethrough.

7. A food waste disposer comprising:
 (a) a rotatable comminuting assembly,
 (b) an electric motor rotor rigidly secured to said comminuting assembly,
 (c) an annular stator disposed radially outward from said rotor,
 (d) a plurality of elongated slots in said stator to receive windings therein,
 (e) said slots extending completely to the inner periphery of said stator and opening toward said rotor,
 (f) said windings consuming only a portion of the area of said slots,
 (g) the remaining area of said slots serving as passageways for the discharge of comminuted food waste from said comminuting assembly.

References Cited

UNITED STATES PATENTS

| | | | |
|---|---|---|---|
| 2,428,816 | 10/1947 | Sigmund | 310—86 |
| 2,497,650 | 2/1950 | Anderson | 310—86 X |
| 2,654,848 | 10/1953 | Schaefer | 310—86 |
| 2,707,080 | 4/1955 | Pezzillo | 241—257 |
| 2,782,997 | 2/1957 | Wolfe | 241—257 X |
| 2,993,449 | 7/1961 | Harland | 103—86 |
| 3,165,271 | 2/1965 | Enright | 241—300 |

WILLIAM W. DYER, JR., *Primary Examiner.*

HARRY F. PEPPER, JR., *Examiner.*